Oct. 29, 1968  M. D. McNAMEE  3,408,102
CAMPER WITH FOLDABLE COMPARTMENT
Filed Jan. 3, 1967  3 Sheets-Sheet 1
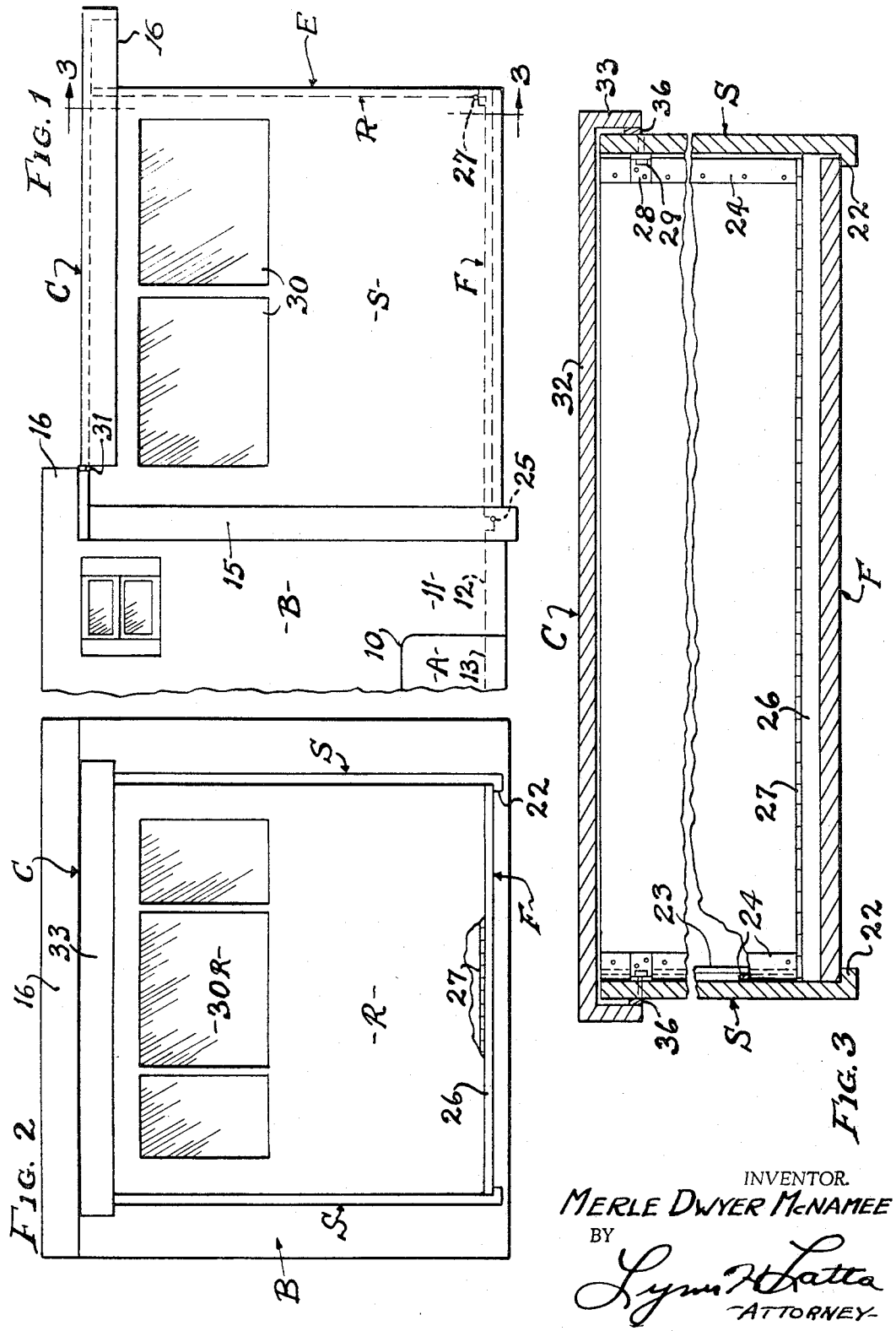
INVENTOR.
MERLE DWYER McNAMEE
BY
Lynn H Latta
ATTORNEY

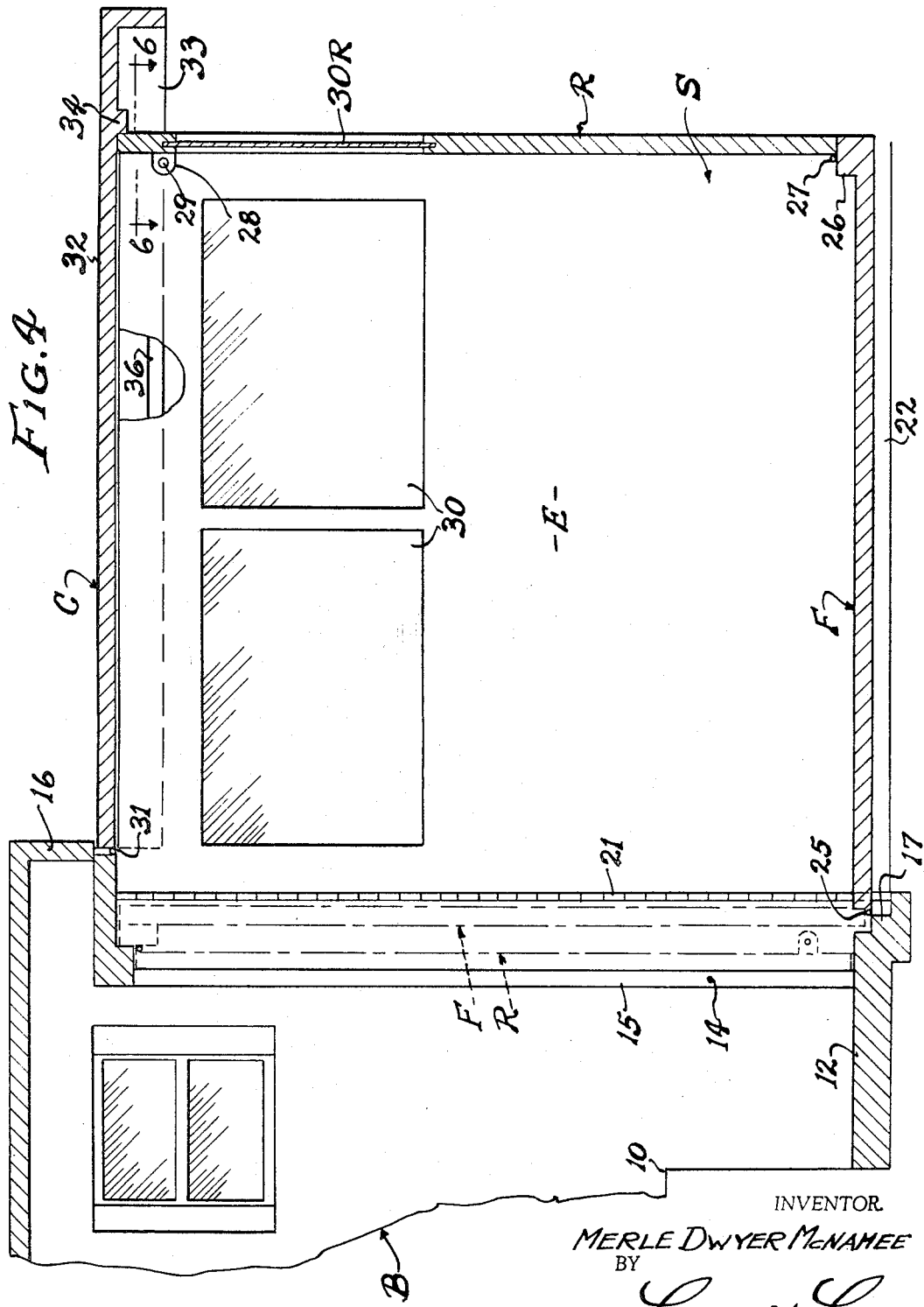

Oct. 29, 1968   M. D. McNAMEE   3,408,102
CAMPER WITH FOLDABLE COMPARTMENT
Filed Jan. 3, 1967   3 Sheets-Sheet 3
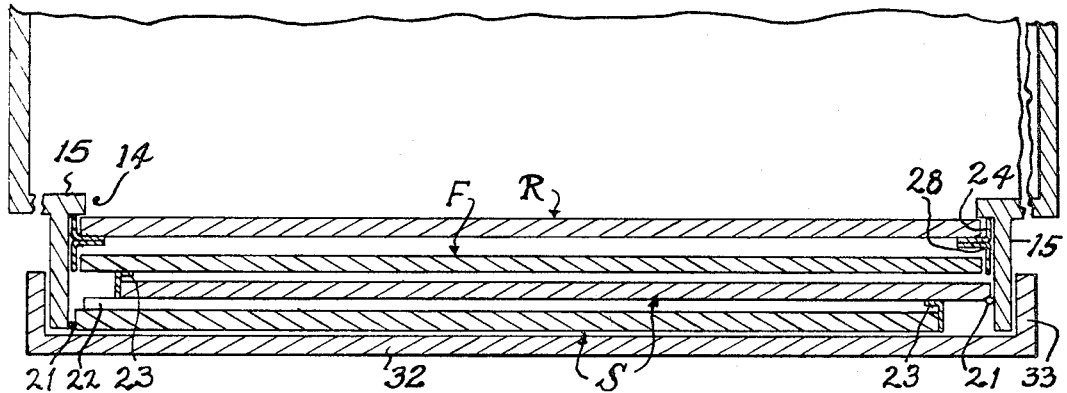
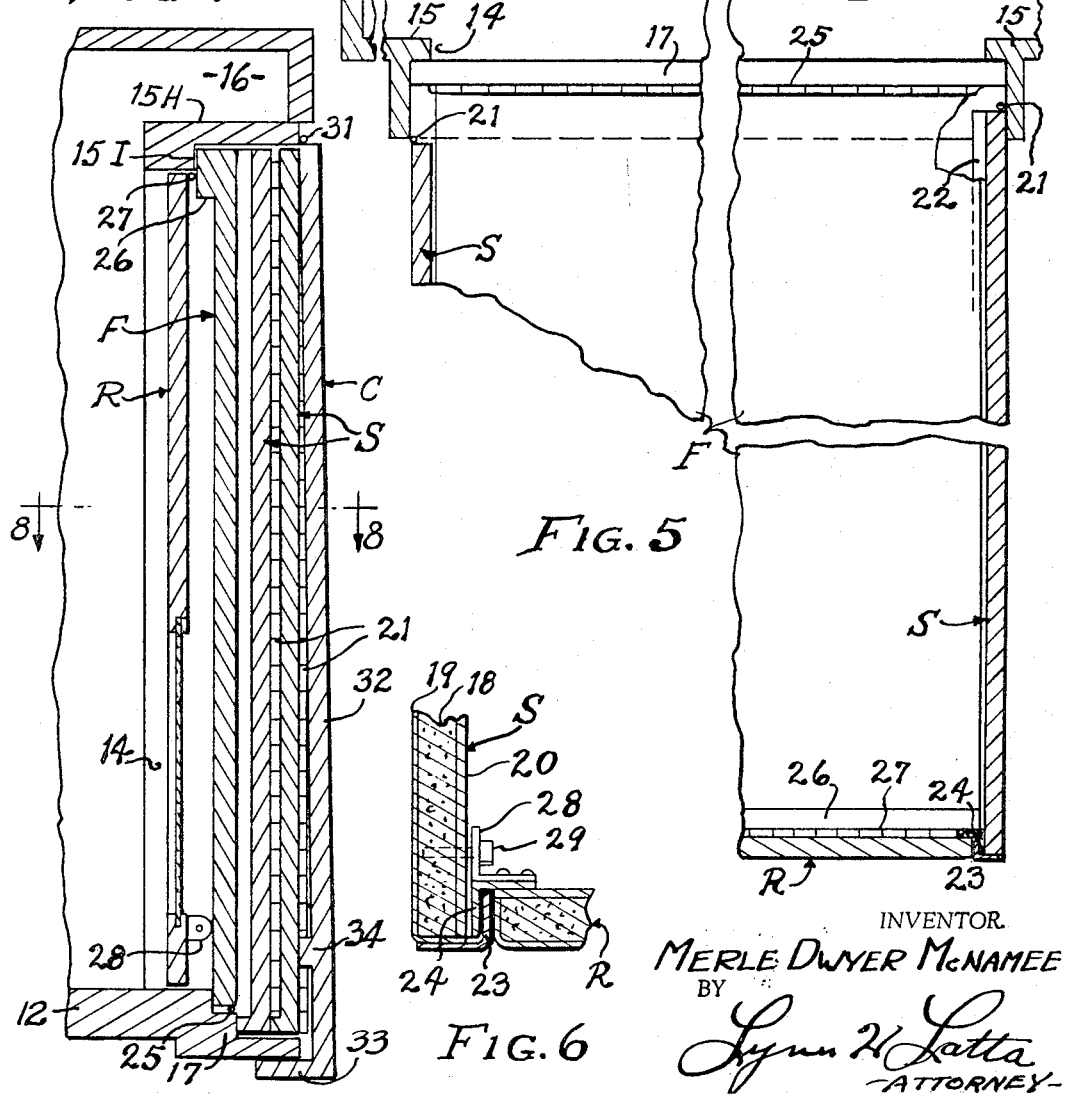
INVENTOR.
MERLE DWYER McNAMEE
BY
Lynn H. Latta
—ATTORNEY—

United States Patent Office 3,408,102
Patented Oct. 29, 1968

3,408,102
CAMPER WITH FOLDABLE COMPARTMENT
Merle D. McNamee, 2501 Rosemead Blvd.,
El Monte, Calif. 91733
Filed Jan. 3, 1967, Ser. No. 606,619
8 Claims. (Cl. 296—23)

ABSTRACT OF THE DISCLOSURE

Disclosed herein is a camper body having at its rear end a foldable compartment comprising respective floor, back, side and roof panels which, in opened-out positions, define a cantilevered, communicating, cubical rearward extension of a fixed camper body, and which are foldable to positions occupying adjacent transverse vertical planes, closing the open rear end of the fixed body. Cantilever support is provided by side panels which are hinged to the sides of the fixed body on vertical axes for transverse swinging. The floor has its side margins supported on longitudinal shoulders along the inner lower margins of the side panels, and swings upwardly to its folded position. The rear panel is hinged to the rear margin of the floor panel, and folds downwardly upon the floor, with which it is then folded upwardly. The side panels fold inwardly behind the floor and rear panels, and the roof panel swings downwardly behind the side panels and functions as a casing in which the other panels are enclosed.

Background of the invention

Vehicles with camper bodies have come into widespread use for vacation travel and mobile living, and customarily consist of an open-bottom body which is attached to a pickup truck bed, utilizing the latter for a floor and providing upward extensions of the sides thereof.

In older and more common campers, the walls are fixed. More recently, some camper bodies have been made sectional, with telescoping roof sections that can be raised for occupancy and lowered for travel with lessened wind resistance. Such campers require the use of power hoist equipment for raising and lowering the roof section. Also, campers have been provided with longitudinally slidable roof canopies, extensible rearwardly to provide shelter over a ground space at the rear of the camper.

In the prior art, vertically telescoping roof sections are disclosed in the following U.S. patents:

Garrison, 3,215,465, Nov. 2, 1965.
Hall, 2,879,103, Mar. 24, 1959.
Thompson, 1,841,991, Jan. 19, 1932.
Rearwardly slidable roof canopy is disclosed by:
Maidl, 2,976,078, Mar. 21, 1961.

Summary of the invention

A principal object of the invention is to provide a camper body having foldable means to extend the interior space thereof to a very substantial extent, in a manner to maintain a substantially weather-sealed enclosure of the enlarged space, and to provide extensions not only of the roof but also of the sides and floor, the rear wall being in effect projected rearwardly from its normal position defining the rear end of the fixed body.

A further object is to accomplish this in a relatively simple construction of hinged panels which interlock with one another to provide a cantilevered rearwardly projecting extension of the fixed body.

Another object is to provide a folding body extension which can be folded manually without requiring the use of hoist or jack mechanism, although power means can be utilized.

These objects are attained, in general, by utilizing vertical hinges to anchor the forward vertical margins of two side panels to vertical side frame members of the open rear end of the fixed camper body so as to provide cantilever anchorage to the fixed body. These side panels are then used as cantilever supports for the floor, rear panel and roof of the extension compartment, the roof resting on the top margins, the floor being hung upon the lower margins of the side panels, and the rear panel resting on the rear end of the floor panel. The side margins of the rear panel interlock with the rear margins of the side panels to tie the latter together, preventing them from spreading, and supplementary locking connections between these panels secure the rear panel in its upright position.

Other objects will become apparent in the ensuing specifications and appended drawings, wherein:

FIG. 1 is a side elevational view of a camper body embodying the invention, in extended condition;

FIG. 2 is a rear end elevational view of the same;

FIG. 3 is a transverse sectional view of the same, taken on line 3—3 of FIG. 1;

FIG. 4 is a vertical longitudinal sectional view of the same;

FIG. 5 is a fragmentary horizontal sectional view of the same;

FIG. 6 is a fragmentary detail sectional of the rear corner interlock joint, taken on line 6—6 of FIG. 4;

FIG. 7 is a vertical sectional view of the folded panels; and

FIG. 8 is a horizontal sectional view of the same taken on line 8—8 of FIG. 7.

Referring now to the drawings in detail, and in particular to FIG. 1, I have shown therein, as an example of one form in which the invention may be embodied, a camper comprising a fixed body B adapted to be mounted on a truck bed A; and an extension compartment E comprising a pair of side panels S, a roof canopy C, a floor panel F, and a rear panel R.

Side panels S are hinge-anchored to fixed body B and are thereby cantilever-supported when extended rearwardly. The floor and rear panels, when extended, are interlocked with the side panels, and the roof canopy C rests upon the side panels. Thus the entire extension compartment E is cantilever-supported from the hinge-anchorage of the side panels, and all panels can be manually handled between folded and extended positions and vice versa.

Detailed description

Fixed body B has rectangular cutouts 10 in its side walls, to fit the body to a truck bed A, the body B having a rear end portion that is offset downwardly, at 11 to provide a rearward extension of truck bed A, and including a floor section 12 which provides a rearward extension of the floor 13 of the truck bed A. The rear end portion of camper body B has a substantially full-width opening 14, framed by upright frame members 15 (FIG. 8). Body B has a roof which overhangs its rear end at 16, and a transverse threshold member 17 at the rear end of floor 12. The top of opening 14 is defined by a header 15H which may have a stop shoulder 151.

Extension side panels S are anchored to the vertical rear end frame members 15 by piano hinges 21 (FIGS. 4 and 5) extending along the forward margins of panels S. Along their lower inner margins the side panels S are provided with shoulder strips 22 on which rest the side margins of floor panel F in its extended position (FIGS. 2 and 3). The vertical rear end margins of side panels S are provided with lock flanges 23 (FIGS. 5 and 6) which are spaced inwardly from the inner sides of panels S to provide lock channels in which are received lock flanges 24 that are secured to the respective sides of rear panel R and spaced outwardly from the side margins thereof so as to define interlock channels to receive the lock flanges 23.

Side panels S are of insulated wall construction (FIG. 6) each including a core sheet 18 of cellular material (e.g. foamed rigid plastic board such as polystyrene known as "Styrofoam" or any equivalent insulating material) with a sheet metal outer facing 19 which may be of sheet aluminum, and with an interior trim facing 20 of pressed fiber or plywood sheet material, bonded together in a sandwich structure as shown in FIG. 6. The roof canopy C and rear panel R are of similar construction, though shown schematically in simple unitary section for clarity. The floor panel F may be of a sturdier material (e.g. 1" plywood) for adequate strength to support occupants. Side panels S are provided with suitable windows 30 for interior daylight light.

Side panels S are adapted to swing laterally inwardly around hinges 21 into mutually over-lapping folded positions (FIG. 8) in substantially parallel, adjacent transverse vertical planes immediately behind floor and rear panels F and R. Piano hinges 21, extending full height along the forward margins of side panels S, provide rugged and adequate support on which the entire weight of the extension compartment and its contents and occupants when extended, are cantilevered with solid support. Piano hinges 21 also serve to substantially weatherseal the gaps between the vertical margins coupled thereby. Additional weather stripping to cover the hinges, can be employed but is omitted from this disclosure for the sake of clarity. The length of panels S is somewhat less than the breadth between vertical frame members 15 (FIG. 8) so that the panels S can be received transversely between frame members 15 when folded.

Floor panel F has its forward margin anchored to the threshold 17 by transverse hinge means 25 which likewise is preferably a piano hinge for maximum strength and also for sealing the gap between the hinge-coupled margins. Along its rear end margin is a transverse spacer strip 26, to which is hinged, at 27, the lower transverse margin of rear panel R. In folding, panel R may be hinged forwardly and downwardly upon floor panel F, in parallel, adjacent relation thereto, and the two panels can then be folded upwardly to the vertical positions shown in phantom in FIG. 4, forwardly of the side panels S, which can then be closed inwardly behind the panels F and R as shown in FIG. 8.

Rear panel R has along its side margins the lock flanges 24 previously described. Flanges 24 face rearwardly so as to enter the channels of lock flanges 23 of side panels S upon upward-rearward swinging of rear panel R. Conversely, the interlock of flanges 23, 24 is released by swinging panel R forwardly and downwardly. It will now be apparent that this interlock functions (1) to support the rear panel R against rearward movement past the rear vertical margins of side panels S, and (2) to tie the rear margins of side panels S together with a bridging connection which prevents spreading of the side panels at their rear ends.

Rear panel R is provided with fastener ears 28 at respective side margins thereof near its upper corners, ears 28 having apertures through which fastener pins 29 are insertible into properly positioned keeper holes (not shown) in side panels S. Thus the rear panel R is locked to the side panels S in its upright extended position (FIG. 4) with its lock flanges 23 coupled to lock flanges 24 of the side panels, so as to secure the side panels against spreading. This in turn retains the floor support shoulder strips 22 in full supporting engagement with the side margins of floor panel F. Rear panel R serves to hold down the rear end of floor panel F so that the side margins of panel F are snugly seated against shoulder strips 22, thus substantially weather-sealing the joints between the floor and side panels. Rear panel R may be provided with suitable windows 30R for rear lighting.

Roof canopy C is attached to fixed body B by hinge means 31 (e.g. piano hinge) with the hinge 1 joint located beneath the overhang of roof projection 16. The hinging is such that the canopy can fold downwardly behind the folded floor and side panels F and S (FIG. 7).

Canopy C comprises a body panel 32 and an eave skirt 33 extending along the sides and free end thereof. In the folded position of the canopy, the skirt 33 closes around the sides and lower ends of panels F and R, whereby the canopy functions as a casing for these panels as well as an outer closure for opening 14.

Canopy E has a stop strip 34 secured to the inner face of body panel 32, in a position to locate the rear panel R at its upright position (FIG. 4). With the panel R thus located, the apertures of fastener ears 28 will register with the keeper holes in panels S and lock pins 29 can be easily inserted. Canopy C may also have stop strips 36 along the inner faces of the side members of skirt 33, and such strips may function as weather strips as well as stops for positioning side panels S.

Operation

An important aspect of operation of the invention is its adaptability for manual handling of the several panels in folding and opening operations. In order to collapse the extension compartment of FIG. 4 to the folded condition of FIG. 7, the operator enters the compartment E through opening 14, pulls the lock pins 29, engages the rear panel R (as by grasping one of the ears 28) draws the panel R inwardly and downwardly, backing through opening 14 as he does so, and lays it in a horizontal position on floor panel F. He can then exit through the rear end of compartment E which has been opened by lowering the panel R, and while standing on the ground behind the compartment, he lifts the pair of panels F and R to the upraised position shown in phantom in FIG. 4 and in full lines in FIG. 7. The lowering of rear panel R upon floor panel F frees the interlocking connection between the lock flanges 23 and 24, and the raising of panels F and R to the upright position clears the space between side panels S so that these panels can be swung inwardly behind the raised panels F and R. This is done while grasping canopy C with one hand holding it in the raised position, clearing the upper edges of panels S as they are folded inwardly. The canopy C is then lowered and latched to the frame structure 15 by suitable latch means (not shown). The camper is thus reduced to minimum dimensions for travelling.

For opening the compartment E (e.g., for an overnight stop) the steps described above are reversed. The canopy C is unlatched, lifted to a level position, and held there while the side panels S are opened outwardly to positions parallel to the longitudinal axis of camper body B. Such positions are determined by engagement of panels S against the inner faces of the side members of skirt 33 or against stop strips 36. Panels F and R can then be lowered, with their side margins clearing the inner faces of panels S, and this is done by entering camper body B and pushing against the panel R, an assistant on the outside supporting the panels F and R while lowering them until the side margins of panel F come to rest upon shoulder strips 22. Alternatively, a suitable handle (not shown) can be provided on the outer face of floor panel F and a single operator can use such handle to lower the two panels from the outside. The operator then enters E from body B, raises rear panel R to upright position determined by engagement with stop strip 34, and then locks it to side walls S by inserting lock pin 29 through fastener ears 28.

A preferred material for floor panel F is a sandwich panel comprising a core of cellular material such as is specified above, and facings of thin plywood bonded to the opposite faces thereof.

I claim:

1. In a mobile housing unit including a body having a rear end opening, foldable extension rear end compartment means comprising:

a pair of side panels hinged to the rear end of said body on vertical axes at respective sides of said opening whereby said side panels are foldable by transverse inwardly swinging movement from outwardly-extended positions in laterally-spaced substantially parallel vertical planes;

a floor panel hinged to said body at the bottom of said opening for upward folding movement from a horizontal position providing a floor for said extension compartment, said floor panel having a width such as to be received between said side panels when the latter are in said extended positions, said side panels having means adjacent their lower margins engageable with the side margins of said floor panel to support it in said horizontal position;

a roof canopy panel hinged to said body at the top of said opening for downward folding from a horizontal position above and supported by said side panels;

and a rear panel hinged along a transverse horizontal axis to one of said floor and roof canopy panels for folding thereagainst in face-to-face associated relation and for subsequent movement therewith to an ultimate folded position in a vertical transverse plane traversing said opening; the parts being arranged and proportioned so as to dispose said panels, when folded, in adjacent vertical transverse planes in closing relation to said opening, with said side panels disposed in mutually overlapping relation behind said floor panel, and with said roof canopy disposed behind said floor and side panels.

2. A mobile housing unit as defined in claim 1, wherein said rear panel is hinged to the rear end of said floor panel for downward folding thereon preparatory to upward folding of the associated panels into said opening, ahead of said side panels.

3. A mobile housing unit as defined in claim 2, wherein said roof canopy panel is arranged to close behind all of the other panels, in covering relation thereto.

4. A mobile housing unit as defined in claim 3, wherein said roof canopy panel includes a marginal skirt proportioned to close around the other panels whereby said canopy panel will encase them in the folded positions of the panels.

5. A mobile housing unit as defined in claim 4, wherein said body includes a rearwardly projecting frame portion defining said opening and wherein said marginal skirt is proportioned to close around said frame portion for weather-sealing said opening.

6. A mobile housing unit as defined in claim 1, wherein said side panels include support shoulders on their inner sides along their lower margins, said floor panel being supported in its extended position by engagement of its lateral margins upon said shoulders, said engagement substantially weather-sealing said floor to said side panels.

7. In a mobile housing unit including a body having a rear end opening, foldable extension rear end compartment means comprising;

a pair of side panels hinged to the rear end of said body on vertical axes at respective sides of said opening whereby said side panels are foldable by transverse inwardly swinging movement;

a floor panel hinged to said body at the bottom of said opening for upward folding movement from a horizontal position providing a floor for said extension compartment, said side panels having means engageable with said floor panel to support it in said horizontal position;

a roof canopy panel hinged to said body at the top of said opening for downward folding from a horizontal position above and supported by said side panels;

and a rear panel hinged along a transverse horizontal axis to one of said floor and roof canopy panels for folding thereagainst in face-to-face associated relation and for subsequent movement therewith to an ultimate folded position in a vertical transverse plane traversing said opening; the parts being arranged and proportioned so as to dispose said panels, when folded, in adjacent vertical transverse planes in closing relation to said opening, with said side panels disposed in mutually overlapping relation behind said floor panel, and with said roof canopy disposed behind said floor and side panels;

said side panels being provided with lock flanges projecting forwardly from their rear vertical margins and spaced inwardly from their inner faces to define lock channels, said rear panel having, along its vertical margins, rearwardly projecting lock flanges positioned to be coupled into said lock channels, and said rear panel being hinged to the rear end of said floor panel for swinging upwardly and rearwardly from a folded position overlying said floor panel to an upstanding position in which its said lock flanges enter said lock channels to arrest rearward swinging of said rear panel and to weather-seal the same to said side panels.

8. In a mobile housing unit including a body having a rear end opening, foldable extension rear end compartment means comprising:

a pair of side panels hinged to the rear end of said body on vertical axes at respective sides of said opening whereby said side panels are foldable by transverse inwardly swinging movement;

a floor panel hinged to said body at the bottom of said opening for upward folding movement from a horizontal position providing a floor for said extension compartment, said side panels having means engageable with said floor panel to support it in said horizontal position;

a roof canopy panel hinged to said body at the top of said opening for downward folding from a horizontal position above and supported by said side panels;

and a rear panel hinged along a transverse horizontal axis to one of said floor and roof canopy panels for folding thereagainst in face-to-face associated relation and for subsequent movement therewith to an ultimate folded position in a vertical transverse plane traversing said opening; the parts being arranged and proportioned so as to dispose said panels, when folded, in adjacent vertical transverse planes in closing relation to said opening, with said side panels disposed in mutually overlapping relation behind said floor panel, and with said roof canopy disposed behind said floor and side panels;

said rear panel being hinged to the rear end of said floor panel for swinging upwardly and rearwardly from a folded position overlying said floor panel to an upstanding position between the rear vertical margins of said side panels, and including apertured fastener ears on the upper corners of said rear panel, projecting forwardly in adjacent relation to the inner faces of said side panels in the extended positions of the panels, and fastener pins adapted to be projected through said ears, said side panels having keeper holes to receive said pins whereby to lock said rear panel to said side panels in said upstanding position.

References Cited

FOREIGN PATENTS 705,795 3/1965 Canada.
566,743 12/1958 Canada.
376,998 7/1932 Great Britain.

PHILIP GOODMAN, *Primary Examiner.*